United States Patent [19]
Kokoszka

[11] 3,890,271
[45] June 17, 1975

[54] POLISH INGREDIENT
[75] Inventor: John G. Kokoszka, Midland, Mich.
[73] Assignee: Dow Corning Corporation, Midland, Mich.
[22] Filed: Feb. 1, 1974
[21] Appl. No.: 438,806

Related U.S. Application Data
[62] Division of Ser. No. 330,375, Feb. 7, 1973, Pat. No. 3,836,371.

[52] U.S. Cl.......... 260/46.5 R; 106/10; 260/46.5 G; 260/46.5 E
[51] Int. Cl. ............................................. C08f 11/04
[58] Field of Search ...... 260/46.5 R, 46.5 E, 46.5 G

[56] References Cited
UNITED STATES PATENTS

| | | | |
|---|---|---|---|
| 3,127,363 | 3/1964 | Nitzsche et al. | 260/46.5 G |
| 3,544,498 | 12/1970 | Holdstock et al. | 260/46.5 G |
| 3,702,769 | 11/1972 | Vaughn | 260/46.5 G |

*Primary Examiner*—Melvyn I. Marquis
*Attorney, Agent, or Firm*—Jack E. Moermond

[57] ABSTRACT

There is claimed a mixture consisting essentially of (1) 45 to 99.5% by weight of a hydroxyl endblocked polydimethylsiloxane having a viscosity in the range of 10 to 15,000 cs. at 25°C., (2) 0.3 to 35% by weight of a silane having the formula (RO)$_3$SiR'NHR'' or (RO)$_3$SiR'NHCH$_2$CH$_2$NH$_2$ wherein R is an alkyl radical containing from 1 to 4 carbon atoms, R' is a divalent hydrocarbon radical free of aliphatic unsaturation and contains from 3 to 4 carbon atoms, and R'' is a hydrogen atom or a methyl radical, and (3) 0.2 to 25% by weight of a silane having the general formula X$_3$SiZ wherein X is an alkoxy or acyloxy radical containing from 1 to 4 carbon atoms and Z is a nonhydrolyzable hydrocarbon or halohydrocarbon radical or a nonhydrolyzable radical composed of carbon, hydrogen and oxygen atoms wherein the oxygen atoms are present in hydroxyl groups, ester groups or ether linkages, there being from 1 to 10 carbon atoms in the Z radical. This composition is incorporated in polishes, particularly wax containing polishes such as furniture and floor polishes, whereby detergent resistance and easy rubout are obtained.

6 Claims, No Drawings

3,890,271

POLISH INGREDIENT

This is a division of application Ser. No. 330,375, filed Feb. 7, 1973 now U.S. Pat. No. 3,836,371.

Research in the field of polishes is somewhat akin to the alchemists' search for the miraculous philosophers' stone. That is to say, researchers in the field of polishes are constantly looking for ingredients and polish formulations which will result in the finished product having all those properties desired and none of the detrimental properties often encountered. And who is to say they will not succeed. For although the alchemists did not find the philosophers' stone, their dreams have been realized to a large extent with the coming of the Atomic Age which made the transmutation of elements a reality. While the present invention is not the ultimate solution to all the problems in the field of polishes, it is believed to be a significant step forward toward that end.

The one essential function of all polishes, particularly wax containing polishes, is protection of the article to which they are applied. Ancillary, but nonetheless important, properties and functions which the polishes should possess include, among others, appearance (gloss) of article; durability to water, solvent (alcohol) and detergents; little or no build up with repeated applications; and easy application (i.e., easy to wipe out or rub out).

It is an object of this invention to provide a composition which when incorporated into a polish will result in substantial improvements in those characteristics mentioned above. More specifically, it is an object of this invention to provide a composition which when incorporated into a polish will improve the polish's durability (particularly detergent resistance), resistance to build up, and ease of application, without sacrificing protection and appearance. Other objects and advantages of the present invention will be apparent from the following description, examples and claims.

This invention relates to a composition which consists essentially of (1) 45 to 99.5% by weight of a hydroxyl endblocked polydimethylsiloxane having a viscosity in the range of 10 to 15,000 cs. at 25°C., (2) 0.3 to 35% by weight of a silane selected from the group consisting of those having the general formulae $(RO)_3SiR'NHR''$ and $(RO)_3SiR'NHCH_2CH_2NH_2$ wherein R is an alkyl radical containing from 1 to 4 carbon atoms, R' is a divalent hydrocarbon radical free of aliphatic unsaturation and contains from 3 to 4 carbon atoms, and R'' is selected from the group consisting of the hydrogen atom and the methyl radical, and (3) 0.2 to 25% by weight of a silane having the general formula $X_3SiZ$ wherein X is selected from the group consisting of alkoxy and acyloxy radicals containing from 1 to 4 carbon atoms and Z is a nonhydrolyzable radical selected from the group consisting of hydrocarbon radicals, halogenated hydrocarbon radicals and radicals composed of carbon, hydrogen and oxygen atoms wherein the oxygen atoms are present in hydroxyl groups, ester groups or ether linkages, there being from 1 to 10 carbon atoms in the Z radical.

This invention further relates to an improvement in polishes, particularly those containing a wax, which comprises incorporating into the polishes a mixture as defined above.

In the above formulae R can be an alkyl radical containing from 1 to 4 carbon atoms. Thus R can be, for example, a methyl, ethyl, propyl, isopropyl, butyl or tertiary-butyl radical. Preferably R is a methyl, ethyl or isopropyl radical.

R' in the above formulae can be any divalent hydrocarbon radical free of aliphatic unsaturation which contains 3 or 4 carbon atoms. Thus R' can be, for example, a $-(CH_2)_3-$, $-(CH_2)_4-$ or a $-CH_2CH(CH_3)CH_2-$ radical. The function of the R' radical is to link the silicon and nitrogen atoms, and there must be at least three carbon atoms between the silicon and nitrogen atoms.

In the silane (3), X can be any alkoxy or acyloxy radical containing from 1 to 4 carbon atoms. Thus X can be, for example, a methoxy, ethoxy, isopropoxy, butoxy, formyloxy, acetoxy or a propionoxy radical. Preferably X is a methoxy or an acetoxy radical.

The Z radical of silane (3) can be any nonhydrolyzable hydrocarbon or halohydrocarbon radical or a nonhydrolyzable radical composed of carbon, hydrogen and oxygen atoms wherein the oxygen atoms are present as hydroxyl, ester or ether groups or linkages. There can be from 1 to 10 carbon atoms in Z. Specific examples of Z include the methyl, ethyl, propyl, isopropyl, butyl, amyl, hexyl, 2-ethylhexyl, decyl, vinyl, allyl, decenyl, cyclohexyl, phenyl, benzyl and tolyl radicals; the corresponding halogenated radicals such as the chloropropyl, trifluoropropyl, and dichlorophenyl radicals; and the hydroxybutyl, hydroxyphenyl, $(CH_2)_3OOCC(CH_3)=CH_2$, $$-(CH_2)_3OCH_2\overset{O}{\overset{\diagup\diagdown}{C}H-CH_2} \text{ and}$$

$-(CH_2)_3OCH_3$ radicals.

It does not appear at this time that there is any criticality in the method of preparing the composition of this invention. The simplest and preferred method is to cold blend the three ingredients using such proportions as will give a composition in which the amounts of (1):(2):(3) will be in the percentage ranges set forth above.

The amount of the composition of this invention which is incorporated into a wax-containing polish will depend on the particular formulation, the intended use of the formulation, and the properties being sought by the formulator. Generally speaking, however, an amount in the range of 0.25 to 5 percent by weight based on the total weight of the formulation will satisfy most situations.

The composition of this invention can be used to impart detergent resistance ease of rub-out, and other improved properties to any of the standard types of polishes; namely, solvent-based polishes, water-based (emulsion) polishes, or paste wax polishes. The composition of this invention is particularly useful in preparing automobile polishes but also is useful in preparing furniture, metal and other kinds of polishes.

The various waxes, solvents, surfactants, thickening agents, abrasives, dyes, odorants, and other ingredients normally used in making polishes are well known to those skilled in the art and are described in numerous places in the literature. Specific illustrative examples of suitable ingredients will be set forth in the examples. Now in order that those skilled in the art may better understand how the present invention can be practiced, the following examples are given by way of illustration and not by way of limitation. All parts and percents referred to herein are on a weight basis, and all viscosities measured at 25°C., unless otherwise specified.

Example 1

A composition was prepared by cold blending a mixture of 75% of a hydroxyl endblocked polydimethylsiloxane having a viscosity of about 40 cs., 15% of $(CH_3O)_3Si(CH_2)_3NHCH_2CH_2NH_2$ and 10% of $(CH_3O)_3SiCH_3$.

An automobile cleaner/polish was prepared which consisted essentially of 2% of the composition of this invention set forth above, 2% of a trimethylsilyl-endblocked polydimethylsiloxane having a viscosity of about 12,500 cs., 1% of a polyhydric alcohol fatty acid ester surfactant containing unesterified hydroxy groups (Emcol 14), 25% of Stoddard solvent, 10% of kaolin clay abrasive (Kaopolite SF-O) and 60% water. This composition was prepared by first mixing all the ingredients except water together and then slowly adding the water to the resulting mixture while continuously mixing well. This polish is a water-in-oil emulsion. This polish was easy to rub-out and had excellent gloss and detergent resistant properties when used on automobiles.

It is noted at this point that when the compositions of this invention are incorporated into polishes that water repellency develops almost immediately after the polish is applied whereas 3 to 4 hours are needed for detergent resistance to develop. Optimum detergent resistance appears to develop after about 24 hours.

Example 2

An automobile cleaner/polish was prepared which consisted essentially of (a) 1% of a composition consisting of 75% of a hydroxyl endblocked polydimethylsiloxane having a viscosity of about 40 cs., 15% of $(CH_3O)_3Si(CH_2)_3NHCH_2CH_2NH_2$ and 10% of $(CH_3O)_3SiCH_3$, (b) 6% of a composition consisting of 90% of a hydroxyl endblocked polydimethylsiloxane having a viscosity of about 400 cs. and 10% of $(CH_3O)_3Si(CH_2)_3NHCH_2CH_2NH_2$, (c) 1% of a polyhydric alcohol fatty acid ester surfactant containing unesterified hydroxy groups (Emcol 14), (d) 22% of Stoddard solvent, (e) 10% of kaolin clay abrasive (Kaopolite SF-O), and (f) 60% of water. This composition was prepared following the procedure of Example 1 to obtain an oil-in-water emulsion. This polish also was easy to rub-out and had excellent gloss and detergent resistance.

Example 3

An auto polish was prepared which consisted essentially of (1) 0.6% of phenyl stearic acid, (2) 6.0% of a composition consisting of 90% of a hydroxyl endblocked polydimethylsiloxane having a viscosity of about 400 cs. and 10% of $(CH_3O)_3Si(CH_2)_3NHCH_2CH_2NH_2$, (3) 2.0% of a composition consisting of 75% of a hydroxyl endblocked polydimethylsiloxane having a viscosity of about 40 cs., 15% of $(CH_3O)_3Si(CH_2)_3NHCH_2CH_2NH_2$ and 10% of $(CH_3O)_3SiCH_3$, (4) 10.0% of kerosene, (5) 16.4% of Stoddard solvent, (6) 10.0% of kaolin clay abrasive (Kaopolite SF-O), (7) 1.0% of a polyhydric alcohol fatty acid ester surfactant containing unesterified hydroxy groups (Emcol 14), and (8) 54.0% of water.

The above composition was prepared by first mixing ingredients (1), (2) and (3) for 5 minutes. Then ingredients (4), (5), (6) and (7) were added with mixing to insure uniformity. Finally, the water was added slowly with good agitation. The resulting water-in-oil emulsion polish had excellent detergent resistance and a high degree of corrosion resistance.

The following table illustrates the corrosion resistance of the above prepared polish to presently available commercial polishes.

| Test Method | Elapsed Time for First Corrosion To Appear on Metal Surfaces | |
|---|---|---|
| | Commercial Polishes* | Polish of This Example |
| A. Polished steel panels immersed in 120°F. distilled water | 15–20 minutes | 210 minutes |
| B. Polished steel panels sprayed with 5% NaCl solution at 100°F. and 100% humidity (ASTM B-117-61) | 10–20 minutes | 120 minutes |
| C. 5% NaCl solution puddled on polished steel panels | 10–15 minutes | 90 minutes |
| D. Polished steel panel placed in Q-panel tester at 104°F. and constant humidity chamber | 1–3 hours | 12+ hours |

*Master-Wax, Liquid GT Wax, Vista, Turtle Wax Hardshell, Turtle Wax Super Hardshell, Weather Wax, Jet-Wax and NuCar Wax.

Example 4

A detergent resistant water-based paste auto polish/cleaner was prepared which consisted essentially of (1) 1.5% of a polyhydric alcohol fatty acid ester surfactant containing unesterified hydroxy groups (Emcol 14), (2) 4.0% of a trimethylsilyl-endblocked polydimethylsiloxane having a viscosity of about 1000 cs., (3) 10.0% of carnauba wax No. 3, (4) 0.4% of morpholine, (5) 25.0% of deodorized kerosene (Isopar L) (6) 2.0% of a composition consisting of 75% of a hydroxyl endblocked polydimethylsiloxane having a viscosity of about 40 cs., 15% of $(CH_3O)_3Si(CH_2)_3NHCH_2CH_2NH_2$ and 10% $(CH_3O)_3SiCH_3$, (7) 10.0% of kaolin clay abrasive (kaopolite SF-O), and (8) 47.1% of water.

This product was prepared by placing ingredients (1), (2), and (3) and 1/2 of ingredient (5) in a vessel and heating to melt the wax at approximately 90°C. with agitation. (Caution should be used in this step as the mixture is flammable.) Next the morpholine is added with agitation. Then ingredient (6) in the remaining ingredient (5) is added, followed by the addition of ingredient (7), all with agitation, and keeping the temperature at 80°C. When the mixture is uniform, the water is added slowly with agitation and maintaining the temperature at 80°C. After all the water is added the heat is removed but mixing is continued until the temperature drops to 55°C. at which point the composition may be poured into containers.

This creamy paste polish in addition to being detergent resistant has outstanding rub-out compared to currently available products on the market, and excellent depth of gloss.

Example 5

An auto rinse polish was prepared which consisted essentially of (1) 44% of a composition which consisted of 75% of a hydroxyl endblocked polydimethylsiloxane having a viscosity of about 40 cs., 15% of $(CH_3O)_3Si(CH_2)_3NHCH_2CH_2NH_2$ and 10% of $(CH_3O)_3SiCH_3$, (2) 50% isopropyl alcohol (99% pure), and (3) 6% of glacial acetic acid. This concentrate was prepared by mixing ingredients (2) and (3) and then adding them to ingredient (1).

For use, one part of the above concentrate is mixed with 20 parts of water for excellent water beading and gloss on a clean car finish. One ounce of concentrate is enough for most automobiles.

The diluted concentrate can be applied by use of a sponge or cloth and rinsed with water without drying. The diluted concentrate can also be applied and wiped to dryness with a cloth. Added wiping gives improved polish performance.

Example 6

When the following compositions are substituted for ingredient (1) of Example 5 or the corresponding ingredient in the other examples, similar results are obtained.

| | | | |
|---|---|---|---|
| (A) | 45% | HO[(CH$_3$)$_2$SiO]$_x$H | viscosity 100 cs. |
| | 35% | (C$_2$H$_5$O)$_3$SiCH$_2$CH(CH$_3$)CH$_2$NHCH$_2$CH$_2$NH$_2$ | |
| | 20% | (CH$_3$COO)$_3$SiCH$_3$ | |
| (B) | 90% | HO[(CH$_3$)$_2$SiO]$_x$H | viscosity 80 cs. |
| | 5% | (C$_3$H$_7$O)$_3$Si(CH$_2$)$_3$NHCH$_2$CH$_2$NH$_2$ | |
| | 5% | (C$_3$H$_7$O)$_3$SiCH$_3$ | |
| (C) | 75% | HO[(CH$_3$)$_2$SiO]$_x$H | viscosity 50 cs. |
| | 10% | (C$_4$H$_9$O)$_3$Si(CH$_2$)$_3$NH$_2$ | |
| | 15% | (C$_4$H$_9$O)$_3$SiC$_4$H$_9$ | |
| (D) | 80% | HO[(CH$_3$)$_2$SiO]$_x$H | viscosity 10 cs. |
| | 10% | (C$_2$H$_5$O)$_3$Si(CH$_2$)$_3$NH(CH$_3$) | |
| | 10% | (C$_2$H$_5$O)$_3$SiC$_2$H$_5$ | |
| (E) | 65% | HO[(CH$_3$)$_2$SiO]$_x$H | viscosity 15,000 cs. |
| | 15% | (CH$_3$O)$_3$Si(CH$_2$)$_3$NHCH$_2$CH$_2$NH$_2$ | |
| | 20% | (CH$_3$O)$_3$Si(CH$_2$)$_3$Cl | |
| (F) | 75% | HO[(CH$_3$)$_2$SiO]$_x$H | viscosity 100 cs. |
| | 15% | (CH$_3$O)Si(CH$_2$)$_3$NHCH$_2$CH$_2$NH$_2$ | |
| | 10% | (CH$_3$O)$_3$Si(CH$_2$)OOCC(CH$_3$)=CH$_2$ | |
| (G) | 75% | HO[(CH$_3$)$_2$SiO]$_x$H | viscosity 100 cs. |
| | 15% | (C$_2$H$_5$O)$_3$Si(CH$_2$)$_3$NH$_2$ | |

10% (CH$_3$O)$_3$Si(CH$_2$)$_3$OCH$_2$CH—CH$_2$
        \ /
         O

| | | | |
|---|---|---|---|
| (H) | 75% | HO[(CH$_3$)$_2$SiO]$_x$H | viscosity 100 cs. |
| | 15% | (CH$_3$O)$_3$Si(CH$_2$)$_3$NHCH$_2$CH$_2$NH$_2$ | |
| | 10% | (C$_2$H$_5$O)$_3$SiC$_6$H$_5$ | |
| (I) | 75% | HO[(CH$_3$)$_2$SiO]$_x$H | viscosity 100 cs. |
| | 15% | (CH$_3$O)$_3$Si(CH$_2$)$_3$NHCH$_2$CH$_2$NH$_2$ | |
| | 10% | (C$_2$H$_5$O)$_3$SiCH=CH$_2$ | |

Example 7

An excellent water based detergent resistant auto polish was prepared which consisted essentially of (1) 50% of a hydroxyl endblocked polydimethylsiloxane having a viscosity of about 4,000 cs., (2) 4% of a trimethyl nonyl polyethylene glycol ether nonionic surfactant (90% solution)(Tergitol TMN-6), (3) 0.7% of an N-alkyl trimethyl ammonium chloride cationic surfactant (50% solution)(Arquad T-50), (4) 0.1% of sodium nitrite, (5) 0.7% of (CH$_3$O)$_3$Si(CH$_2$)$_3$NHCH$_2$CH$_2$NH$_2$, (6) 0.35% of (CH$_3$O)$_3$SiCH$_3$, and (7) 44.15% water.

Example 8

An excellent water based detergent resistant auto polish was prepared which consisted essentially of (1) 50% of a hydroxyl endblocked polydimethylsiloxane having a viscosity of about 4,000 cs., (2) 4% of a trimethyl nonyl polyethylene glycol ether nonionic surfactant (90% solution)(Tergitol TMN-6), (3) 0.7% of an N-alkyl trimethyl ammonium chloride cationic surfactant (50% solution)(Arquad T-50), (4) 0.1% of sodium nitrite, (5) 0.3% of (CH$_3$O)$_3$Si(CH$_2$)$_3$NHCH$_2$CH$_2$NH$_2$, (6) 0.15% of (CH$_3$O)$_3$SiCH$_3$, and (7) 44.75% water.

That which is claimed is:

1. A composition which consists essentially of (1) 45 to 99.5% by weight of a hydroxyl endblocked polydimethylsiloxane having a viscosity in the range of 10 to 15,000 cs. at 25°C., (2) 0.3 to 35% by weight of a silane selected from the group consisting of those having the general formulae (RO)$_3$SiR'NHR'' and (RO)$_3$SiR'NHCH$_2$CH$_2$NH$_2$ wherein R is an alkyl radical containing from 1 to 4 carbon atoms, R' is a divalent hydrocarbon radical free of aliphatic unsaturation and contains from 3 to 4 carbon atoms, and R'' is selected from the group consisting of the hydrogen atom and the methyl radical, and (3) 0.2 to 25% by weight of a silane having the general formula X$_3$SiZ wherein X is selected from the group consisting of alkoxy and acyloxy radicals containing from 1 to 4 carbon atoms and Z is a nonhydrolyzable radical selected from the group consisting of hydrocarbon radicals, halogenated hydrocarbon radicals and radicals composed of carbon, hydrogen and oxygen atoms wherein the oxygen atoms are present in hydroxyl groups, ester groups or ether linkages, there being from 1 to 10 carbon atoms in the Z radical.

2. A composition as defined in claim 1 wherein (1) is 65 to 85% and the viscosity is in the range of 10 to 1,000 cs., (2) is 10 to 20% and has the formula (RO)$_3$SiR'NHCH$_2$CH$_2$NH$_2$, and (3) is 5 to 15%, X is an alkoxy radical and Z is an alkyl radical.

3. A composition as defined in claim 2 wherein (1) is about 75%, (2) is about 15% and has the formula (CH$_3$O)$_3$Si(CH$_2$)$_3$NHCH$_2$CH$_2$NH$_2$, and (3) is about 10% and has the formula (CH$_3$O)$_3$SiCH$_3$.

4. A composition as defined in claim 2 wherein (1) is about 75%, (2) is about 15% and has the (C-

$H_3O)_3SiCH_2CH(CH_3)CH_2NHCH_2CH_2NH_2$, and (3) is about 10% and has the formula $(CH_3O)_3SiCH_3$.

5. A composition as defined in claim 1 wherein (1) is 65 to 85% and the viscosity is in the range of 10 to 1,000 cs., (2) is 10 to 20% and has the formula $(RO)_3SiR'NHR''$, and (3) is 5 to 15%, X is an alkoxy radical and Z is an alkyl radical.

6. A composition as defined in claim 5 wherein (1) is about 75%, (2) is about 15% and has the formula $(C_2H_5O)_3Si(CH_2)_3NH_2$, and (3) is about 10% and has the formula $(CH_3O)_3SiCH_3$.

* * * * *